US012030971B2

(12) United States Patent
Mooney et al.

(10) Patent No.: US 12,030,971 B2
(45) Date of Patent: Jul. 9, 2024

(54) TWO-PART CYANOACRYLATE CURABLE ADHESIVE SYSTEM

(71) Applicants: Henkel IP & Holding GmbH, Düsseldorf (DE); Henkel AG & Co. KGaA, Düsseldorf (DE)

(72) Inventors: Aine Mooney, Dublin (IE); Jayesh P. Shah, Plaistow, NH (US); Dipak Tathe, Pune (IN)

(73) Assignee: Henkel AG & Co. KGaA, Duesseldorf (DE)

( * ) Notice: Subject to any disclaimer, the term of this patent is extended or adjusted under 35 U.S.C. 154(b) by 701 days.

(21) Appl. No.: 17/156,888

(22) Filed: Jan. 25, 2021

(65) Prior Publication Data
US 2021/0147597 A1 May 20, 2021

Related U.S. Application Data

(63) Continuation of application No. PCT/EP2019/071569, filed on Aug. 12, 2019.

(30) Foreign Application Priority Data

Aug. 13, 2018 (IN) .............................. 201821030360

(51) Int. Cl.
C08L 33/14 (2006.01)
C08F 222/32 (2006.01)
C08L 63/00 (2006.01)
C09J 4/00 (2006.01)
C09J 133/14 (2006.01)
C09J 11/08 (2006.01)
C09J 163/00 (2006.01)

(52) U.S. Cl.
CPC ............. *C08F 222/322* (2020.02); *C09J 4/00* (2013.01); *C09J 133/14* (2013.01)

(58) Field of Classification Search
None
See application file for complete search history.

(56) References Cited

U.S. PATENT DOCUMENTS

| 4,102,945 A | 7/1978 | Gleave |
| 4,336,367 A | 6/1982 | Morris et al. |
| 4,419,496 A | 12/1983 | Henton et al. |
| 4,444,933 A | 4/1984 | Columbus et al. |
| 4,556,700 A | 12/1985 | Harris et al. |
| 4,622,414 A | 11/1986 | Mckervey |
| 4,636,539 A | 1/1987 | Harris et al. |
| 4,695,615 A | 9/1987 | Leonard et al. |
| 4,718,966 A | 1/1988 | Harris et al. |
| 4,778,851 A | 10/1988 | Henton et al. |
| 4,837,260 A | 6/1989 | Sato et al. |
| 4,855,461 A | 8/1989 | Harris et al. |
| 4,906,317 A | 3/1990 | Liu |
| 5,312,864 A | 5/1994 | Wenz et al. |
| 5,382,635 A | 1/1995 | Mcinnis et al. |
| 5,506,283 A | 4/1996 | Mcinnis et al. |
| 5,530,037 A | 6/1996 | McDonnell et al. |
| 5,693,714 A | 12/1997 | Bauman et al. |
| 5,969,053 A | 10/1999 | Bauman et al. |
| 5,981,659 A | 11/1999 | Geck et al. |
| 6,111,015 A | 8/2000 | Eldin et al. |
| 6,147,142 A | 11/2000 | Geck et al. |
| 6,180,693 B1 | 1/2001 | Tang et al. |
| 6,429,281 B1 | 8/2002 | Dershem et al. |
| 6,607,632 B1 | 8/2003 | McDonnell et al. |
| 6,617,400 B2 | 9/2003 | Yeager et al. |
| 7,777,064 B2 | 8/2010 | Mizori |
| 8,287,687 B1 | 10/2012 | Schueneman et al. |
| 8,981,027 B2 * | 3/2015 | Ward ..................... C09J 4/00 526/297 |
| 2013/0178560 A1* | 7/2013 | Hersee ................ C09J 4/06 523/400 |
| 2014/0275419 A1 | 9/2014 | Ward et al. |
| 2015/0038630 A1 | 2/2015 | Kropp et al. |
| 2020/0255708 A1* | 8/2020 | Choe .................... C08L 21/00 |

FOREIGN PATENT DOCUMENTS

| JP | 62057475 A * | 3/1987 | ............... C09J 3/14 |
| WO | 2004108825 | 12/2004 | |
| WO | 2013126377 A1 | 8/2013 | |
| WO | 2014140804 | 9/2014 | |

OTHER PUBLICATIONS

International search report issued in connection with International Application No. PCT/EP2019/071569 dated Nov. 14, 2019.

* cited by examiner

Primary Examiner — Michael J Feely
(74) Attorney, Agent, or Firm — Steven C. Bauman

(57) ABSTRACT

Two-part cyanoacrylate/cationically curable adhesive systems are provided.

23 Claims, No Drawings

TWO-PART CYANOACRYLATE CURABLE ADHESIVE SYSTEM

BACKGROUND

Field

Two-part cyanoacrylate curable adhesive systems are provided.

Brief Description of Related Technology

Curable compositions such as cyanoacrylate adhesives are well recognised for their excellent ability to rapidly bond a wide range of substrates, generally in minutes and depending on the particular substrate, often in a number of seconds.

Cationically curable compositions generally are well known, in particular epoxy compositions which are widely used. Epoxy compositions once cured are known to form robust bonds between substrates made from many different types of materials. However, epoxy compositions, whether in one or two-parts, do not have anywhere near the same rapid fixture time shown by cyanoacrylates, and may tend to show poor performance properties on substrates constructed from certain materials in particular plastic substrates, such as polycarbonate (PC), acrylonitrile-butadiene-styrene copolymer (ABS), polymethylmethacrylate (PMMA), and polyvinyl chloride (PVC) to name a few.

Two-part compositions comprising cyanoacrylate and an epoxy provide good performance across substrates constructed from a wide variety of materials and provide improved durability performance over conventional cyanoacrylate compositions and improved fixture time and improved plastic bonding over conventional cationically curable compositions. For example International Patent Application Publication No. WO2014/140804 describes two-part cyanoacrylate/cationically adhesive systems, comprising a first part comprising a cyanoacrylate component and a cationic catalyst and a second component comprising an epoxy component. The adhesive systems described therein demonstrated an ability to bond a wide variety of substrates.

Notwithstanding the excellent properties of two-part cyanoacrylate/epoxy compositions there may be on occasion mixing issues wherein the two-parts of the composition are not mixed in the correct ratio, during application of the composition through a mixing nozzle, as there may be a large viscosity difference between the two-parts of the composition, i.e., the viscosity of the cyanoacrylate component is often significantly less than that of the epoxy component.

The lower viscosity of the cyanoacrylate component may also result in sag of the composition, that is, the composition may deform and lose shape under the compositions own weight prior to curing of the composition.

Conventional thixotropic agents, such as fumed silica, are generally known in the art. For example the epoxy component of prior art two-part compositions may comprise a thixotropic agent, such as fumed silica, to increase the viscosity of the epoxy component.

Conventional thixotropic agents are generally compatible with cyanoacrylate compositions, however in two-part systems wherein the cyanoacrylate further comprises a cationic catalyst conventional thixotropic agents, such as fumed silica, tend to make the cyanoacrylate component unstable, leading to gelation of the cyanoacrylate component.

It would be desirable to provide an adhesive system having both the features of an instant cyanoacrylate adhesive, such as fast fixture times and the ability to bond a wide range of substrates such as metals and plastics, together with the robust strength seen with epoxy compositions.

SUMMARY

In one aspect, the present invention provides a two-part curable composition comprising:
(a) a first part comprising a cyanoacrylate component, a cationic catalyst, and a plurality of polyolefin fibres;
(b) a second part comprising a cationic curable component, and an initiator component;
wherein when said parts are mixed together, the cationic catalyst initiates cure of the cationic curable component.

Significantly the polyolefin fibres increase the viscosity of the first part of the composition without affecting stability of the first part of the composition.

Suitably, the first part has an initial viscosity from about 6,000 mPa·s to about 16,000 mPa·s, when measured at 25° C. and wherein the first part has a viscosity of from about 12,000 mPa·s to about 48,000 mPa·s, when measured at 25° C., after aging for 72 hours at 82° C. This advantageously facilitates optimal mixing of the first and second parts.

Suitably, the polyolefin fibres are high density polyethylene.

The polymeric fibres may have an average length of from about 400 µm to about 1000 µm. Optionally the polymeric fibres may have an average length of from about 600 µm to about 800 µm. The polymeric fibres may have an average diameter of more than about 5 µm and less than about 25 µm, e.g., from about 10 µm to about 20 µm.

Suitably, the viscosity of the second part is in the range of from about 20,000 to about 40,000 mPa·s, when measured at 25° C. Advantageously, the viscosity of the second part remains in this range over time.

Preferably, the viscosity of the first part when measured at 25° C., after ageing for 72 hours at 82° C., is less than about three times the initial viscosity of the first part when measured at 25° C.

Advantageously, when the viscosity of the first part is in the range of from about 12,000 mPa·s to about 48,000 mPa·s, when measured at 25° C., after ageing for 72 hours at 82° C., optimal mixing is achieved when combined with Part B.

Suitably, the polyolefin fibres are present in an amount of from about 0.1 wt % to about 5 wt % based on the total weight of the first part, such as from about 0.5 wt % to about 3.5 wt % based on the total weight of the first part, for example from about 0.5 wt % to about 2.5 wt % based on the total weight of the first part, of the two-part composition.

The two-part curable composition may further comprising core-shell rubber particles comprising acrylonitrile butadiene-styrene copolymer and/or methyl methacrylate butadiene styrene copolymer.

Optionally, the core-shell rubber particles may be present in an amount of from about 0.1 to about 5 weight percent, in the first part of the composition, based on the total weight of the first part of the composition.

Suitably, the core-shell rubber particles have an average particle size of from about 50 µm to about 300 µm, such as from about 100 µm to about 200 µm, for example from 100 µm to about 150 µm.

Desirably, the cyanoacrylate component comprises $H_2C=C(CN)-COOR$, wherein R is selected from alkyl, alkoxyalkyl, cycloalkyl, alkenyl, aralkyl, aryl, allyl and haloalkyl groups.

Optionally, the cationic catalyst comprises salts of lithium and metals from Group II of the Periodic Table, and non-nucleophilic acids.

The cationic catalyst may be a non-nucleophilic acid having a pH of less than 1.0 when measured as a 10% by weight solution in water.

The cationic catalyst may be a member selected from the group consisting of fluoroboric, fluoroarsenic, fluoroantimonic and fluorophosphoric acids; lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate; lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts; trialkoxyboroxine curing agents; and combinations thereof.

The cationic curable component may be selected from an epoxy component, an episulfide component, an oxetane component, a vinyl ether component and combinations thereof.

Suitably, the cationic curable component is an epoxy component selected from the group consisting of cycloaliphatic epoxy, aromatic epoxy, aliphatic epoxy and hydrogenated aromatic epoxy.

Desirably, the epoxy component comprises a member selected from the group consisting of epoxy-functionalized: bisphenol-A, bisphenol-F, bisphenol-E, bisphenol-S and biphenyl, and hydrogenated versions of such epoxy functionalised species.

Suitably, the first part is housed in a first chamber of a dual chamber syringe and the second part is housed in a second chamber of the dual chamber syringe.

The first part may further comprise a stabiliser such as phosphoric acid.

The second part may further comprise at least one of a plasticizer, a filler and a toughener.

For example, the toughener may be a member selected from the group consisting of (1) (a) reaction products of the combination of ethylene, methyl acrylate and monomers having carboxylic acid cure sites, (2) (b) dipolymers of ethylene and methyl acrylate, (3) combinations of (a) and (b), (4) vinylidene chloride-acrylonitrile copolymers, (5) and vinyl chloride/vinyl acetate copolymer, (6) copolymers of polyethylene and polyvinyl acetate, and combinations thereof.

The first part and the second part may be present in a ratio of about 1:1 by volume.

Optionally, the first part and the second part are each housed in a separate chamber of a dual chambered container.

Advantageously, the compositions of the invention provide good performance across substrates constructed from a wide variety of materials, for example metallic substrates and plastic substrates.

The composition is less prone to sag due to the presence of the polyolefin fibres. In particular when the first part has an initial viscosity of from about of viscosity of both the first part and the second part being of from at least about 6,000 mPa·s, to about 16,000 mPa·s. That is, the composition, which the first part and the second part has a viscosity of from at least about 6,000 mPa·s, to about 16,000 mPa·s provides a composition which cures prior to deforming under the compositions own weight once it is mixed with a second part as described herein and applied as an adhesive.

Significantly the inclusion of the thixotropic agent in the first part of the composition to provide a the first part cyanoacrylate composition with an initial viscosity of from at least about 6,000 mPa·s to about 16,000 mPa·s, and having a viscosity after ageing for 72 hours at 82° C. of from about 12,000 mPa·s to about 48,000 mPa·s does not adversely affect the fixture time or the toughness of the cured reaction product.

DETAILED DESCRIPTION

The invention will be more readily appreciated by a review of the examples which follow.

Part A

The cyanoacrylate component includes cyanoacrylate monomers, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{7-15}$ aralkyl, $C_{6-15}$ aryl, $C_{3-15}$ allyl and $C_{3-15}$ haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, ß-methoxyethyl cyanoacrylate and combinations thereof. A particularly desirable one is ethyl-2-cyanoacrylate ("ECA").

The cyanoacrylate component should be included in the Part A composition in an amount within the range of from about 50% to about 99.98% by weight, such as about 65% to about 85% by weight being desirable, and about 75% to about 97% by weight of the total composition being particularly desirable.

As the cationic catalyst to be included in the Part A composition of the two-part adhesive system, a hard cation non-nucleophilic anion catalyst should be used. Examples of such catalysts include salts of lithium and metals from Group II of the Periodic Table, and non-nucleophilic acids. Such non-nucleophilic acids have a pH of less than 1.0 when measured as a 10% by weight solution in water and the anion portion of such acids does readily participate in displacement reactions with organic halides. Examples of the Group II metal salts include calcium and magnesium. Examples of non-nucleophilic acids include perchloric, fluoroboric, fluoroarsenic, fluoroantimonic and fluorophosphoric acids. Accordingly, examples of hard cation non-nucleophilic anion salts include lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate.

The cationic catalyst may also include lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts.

Another cationic catalyst suitable for use herein in the Part A composition of the adhesive system are trialkoxyboroxine curing agents, such as are described in U.S. Pat. Nos. 4,336,367 and 6,617,400, the disclosures of each of which are hereby incorporated herein by reference. Of course, combinations of any two or more of these cationic catalysts may be used as well.

Also suitable for use as some or all of the cationic catalyst are boron trifluoride, boron trifluoride-etherate, sulphur trioxide (and hydrolysis products thereof) and methane sulfonic acid, which are oftentimes used to stabilize cyanoacrylate monomers against anionic polymerization (see below), a known issue in shelf life stabilization.

Typically, the amount of cationic catalyst will fall in the range of about 0.001 weight percent up to about 10.00 weight percent of the composition, desirably about 0.01 weight percent up to about 5.00 weight percent of the composition, such as about 0.50 to 2.50 weight percent of the composition.

Additives may be included in the Part A composition of the adhesive system to confer physical properties, such as improved fixture speed, improved shelf-life stability, flexibility, thixotropy, increased viscosity, colour, and improved toughness. Such additives therefore may be selected from accelerators, free radical stabilizers, anionic stabilizers, gelling agents, thickeners, thixotropy conferring agents, dyes, toughening agents, plasticizers and combinations thereof.

These additives are discussed in more detail below. However, the accelerators and stabilizers are discussed here.

One or more accelerators may also be used in the adhesive system, particularly, in the Part A composition, to accelerate cure of the cyanoacrylate component. Such accelerators may be selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the structure below are useful herein:

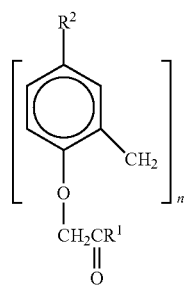

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination include 15-crown-5,18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4,1,2-decalyl-15-crown-5,1,2-naphtho-15-crown-5,3,4,5-naphtyl-16-crown-5,1,2-methyl-benzo-18-crown-6,1,2-methylbenzo-5,6-methylbenzo-18-crown-6,1,2-t-butyl-18-crown-6,1,2-vinylbenzo-15-crown-5,1,2-vinylbenzo-18-crown-6,1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the structure below:

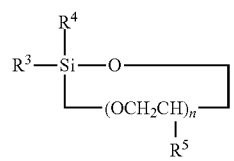

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

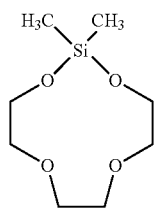

dimethylsila-11-crown-4;

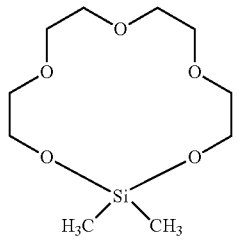 [SMILES: C[Si]1(C)OCCOCCOCCOCCO1]

dimethylsila-14-crown-5;

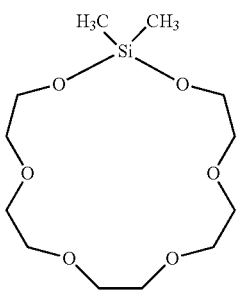 [SMILES: C[Si]1(C)OCCOCCOCCOCCOCCO1]

and dimethylsila-17-crown-6. See e.g., U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as an accelerator component.

In addition, poly(ethylene glycol) di(meth)acrylates suitable for use herein include those within the structure below:

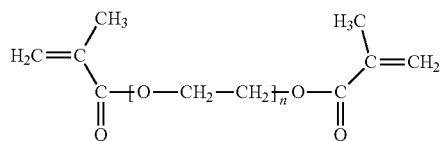

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the structure below:

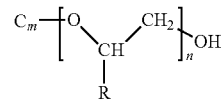

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of such materials include those offered under the DEHYDOL tradename from Cognis Deutschland GmbH & Co. KGaA, Dusseldorf, Germany, such as DEHYDOL 100.

In addition, accelerators embraced within the structure below:

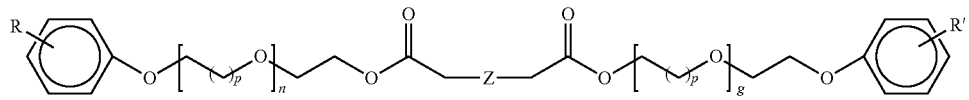

where R is hydrogen, $C_{1-6}$ alkyl, $C_{1-6}$ alkyloxy, alkyl thioethers, haloalkyl, carboxylic acid and esters thereof, sulfinic, sulfonic and sulfurous acids and esters, phosphinic, phosphonic and phosphorous acids and esters thereof, Z is a polyether linkage, n is 1-12 and p is 1-3 are as defined above, and R' is the same as R, and g is the same as n.

A particularly desirable chemical within this class as an accelerator component is:

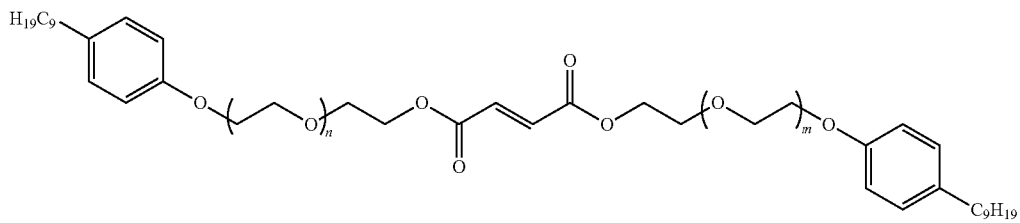

where n and m combined are greater than or equal to 12.

The accelerator should be included in the composition in an amount within the range of from about 0.01% to about 10% by weight, with the range of about 0.1 to about 0.5% by weight being desirable, and about 0.4% by weight of the total composition being particularly desirable.

Stabilizers useful in the Part A composition of the adhesive system include free-radical stabilizers, anionic stabilizers and stabilizer packages that include combinations thereof. The identity and amount of such stabilizers are well known to those of ordinary skill in the art. See e.g. U.S. Pat. Nos. 5,530,037 and 6,607,632, the disclosures of each of which are hereby incorporated herein by reference. Commonly used free-radical stabilizers include hydroquinone, while commonly used anionic stabilizers include boron trifluoride, boron trifluoride-etherate, sulphur trioxide (and hydrolysis products thereof) and methane sulfonic acid. These anionic stabilizers can also serve as the cationic catalyst or a portion thereof, as noted above.

Part B

Cationically curable monomers for use in the Part B composition of the adhesive system include epoxy monomers, episulfide monomers, oxetane monomers, and combinations thereof.

Epoxy monomers for use in Part B of the composition of the adhesive system include a host of epoxy monomers, with some of the epoxy monomers being aromatic, while others are aliphatic and still others are cycloaliphatic. Examples of such epoxy monomers include bisphenol F diglycidyl ethers (and hydrogenated versions thereof), bisphenol A diglycidyl ethers (and hydrogenated versions thereof), bisphenol S diglycidyl ethers (and hydrogenated versions thereof), bisphenol E diglycidyl ethers (and hydrogenated versions thereof), biphenyl diglycidyl ethers (and hydrogenated versions thereof), 4-vinyl-1-cyclohexene diepoxide, butanediol diglycidyl ether, neopentylglycol diglycidyl ether, 3,4-epoxycyclohexylmethyl-3,4-epoxycyclohexanecarboxylate, limonene diepoxide, hexanediol diglycidyl ether, trimethylolpropane triglycidyl ether, aniline diglycidyl ether, diglycidyl ether of propylene glycol, cyanuric acid triglycidyl ether, ortho-phthalic acid diglycidyl ether, diglycidyl ester of linoleic dimer acid, dicyclopentadiene diepoxide, tetrachlorobisphenol A glycidyl ethers, 1,1,1-tris(p-hydroxyphenyl) ethane glycidyl ether, tetra glycidyl ether of tetrakis(4-hydroxyphenyl)ethane, epoxy phenol novolac resins, epoxy cresol novolac resins, tetraglycidyl-4,4'-diaminodiphenylmethane, and the like.

Among the commercially available epoxy resins suitable for use are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, New York; and BREN-S from Nippon Kayaku, Japan; epoxidized polybutadienes, such as those sold under the trade designation PolyBD from Sartomer, EPOLEAD PB 3600 from Daicel, JP-100 and JP-200 from Nippon Soda, epoxidised liquid isoprene rubbers such as KL-610, KL-613 and KL-630T from Kuraray; and epoxidised liquid polyisoprenes such as EPOXYPRENE 25 and EPOXYPRENE 50 from Sanyo Corporation. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Resolution. Of course, cycloaliphatic epoxy resins, such as those available under the CYRACURE tradename, and hydrogenated bisphenol and biphenyl type epoxy resins, as noted, such as those available under the EPALLOY tradename, are suitable for use herein.

Cycloaliphatic epoxy resins contain at least one cycloaliphatic group and at least one oxirane group, oftentimes two oxirane groups. Representative cycloaliphatic epoxy resins include 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl) adipate, bis(3,4-epoxy-6-methylcyclohexylmethyl)adipate, exo-exo bis(2,3-epoxycyclopentyl) ether, endo-exo bis(2,3-epoxycyclopentyl) ether, 2,2-bis(4-(2,3-epoxypropoxy)cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide, a-pinene oxide, 3-vinylcyclohexene oxide, 3-vinylcyclohexene dioxide, epoxidised poly(1,3-butadiene-acrylonitrile), epoxidised soybean oil, epoxidised castor oil, epoxidised linseed oil, 2,2-bis(3,4-epoxycyclohexyl)propane, dicyclopentadiene dioxide, tricyclopentadiene dioxide, tetracyclopentadiene dioxide, 1,2-epoxy-6-(2,3-epoxypropoxy)hexahydro-4,7-methanoindane, p-(2,3-epoxy) cyclopentylphenyl-2,3-epoxypropylether, 1-(2,3-epoxypropoxy)phenyl-5,6-epoxyhexahydro-4,7-methanoindane, o-(2,3 epoxy)cyclopentylphenyl-2,3-epoxypropyl ether), 1,2-bis[5-(1,2-epoxy)-4,7-hexahydromethanoindanoxyl]ethane, cyclopentenylphenyl glycidyl ether, cyclohexanediol diglycidyl ether, and diglycidyl hexahydrophthalate. Siloxane functional epoxy resins may also be utilised such as 1,3-bis(3,4-epoxycyclohexyl-2-ethyl)-1,1,3,3-tetramethyldisiloxane and other epoxy functional linear/cyclic siloxanes such as those disclosed in U.S. Pat. No. 7,777,064, the disclosure of which being hereby expressly incorporated herein by reference. In particular embodiments cycloaliphatic epoxy resins are 3,4-epoxycyclohexylmethyl-3,4-epoxycyclohexanecarboxylate and 3,4-epox-6-methylcyclohexylmethyl-3,4-epoxy-6-methylcyclohexanecarboxylate. Other examples of cycloaliphatic epoxies suitable for use herein include those disclosed and described in U.S. Pat. No. 6,429,281 (Dershem), the disclosure of which being hereby expressly incorporated herein by reference.

And combinations of the epoxy resins are also desirable for use herein.

The episulfide monomer may simply be the full or partial sulphur-containing three-membered ring version of the base epoxy monomer.

The oxetane monomers may be chosen from:

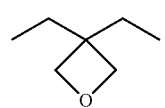

OXT-101

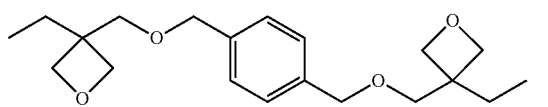

OXT-121

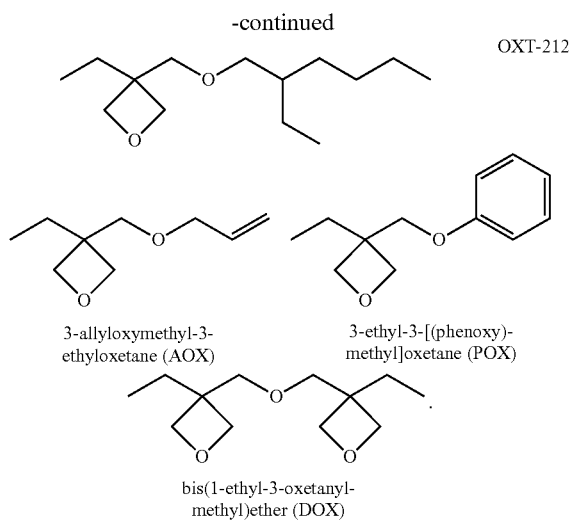

3-allyloxymethyl-3-
ethyloxetane (AOX)

3-ethyl-3-[(phenoxy)-
methyl]oxetane (POX)

bis(1-ethyl-3-oxetanyl-
methyl)ether (DOX)

The vinyl ether monomer may be selected from a host of materials, such as those commercially available under the tradename VEctomer from Vertellus Performance Materials Inc., Greensboro, NC Examples include VEctomer vinyl ether 4010 [Bis-(4-vinyl oxy butyl) isophthalate], VEctomer vinyl ether 4060 [Bis(4-vinyl oxy butyl) adipate], and VEctomer vinyl ether 5015 [Tris(4-vinyloxybutyl)trimellitate].

The epoxy, episulfide, oxetane and/or vinyl ether monomer may be one that is functionalized with one or more alkoxy silane groups. Examples of such materials include those commercially available from Gelest Inc., Morrisville, PA.

As discussed above, additives may be included in either or both of the Part A or the Part B compositions to influence a variety of performance properties.

Fillers contemplated for optional use include, for example, aluminium nitride, boron nitride, silicon carbide, diamond, graphite, beryllium oxide, magnesia, silicas, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns or less.

As regards silicas, the silica may have a mean particle diameter on the nanoparticle size; that is, having a mean particle diameter on the order of $10^{-9}$ meters. The silica nanoparticles can be pre-dispersed in epoxy resins, and may be selected from those available under the tradename NANOPOX, from Nanoresins, Germany. NANOPOX is a tradename for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 wt % silica.

A commercially available example of the NANOPOX products particularly desirable for use herein includes NANOPOX A610 (a 40 percent by weight dispersion in a cycloaliphatic epoxy resin matrix). The NANOPOX products are believed to have a particle size of about 5 nm to about 80 nm, though the manufacturer reports less than 50 nm.

The silica component should be present in an amount in the range of about 0.1 to about 20 percent by weight, such as about 1 to about 10 percent by weight, desirably about 2 to about 4 percent by weight, based on the total weight of the composition. For example, the silica component may be present in an amount of from about 2 to about 5 weight percent in the Part B component, based on the total weight of the Part B composition. Preferably, the silica component is in Part B only.

Flexibilizers (also called plasticizers) contemplated for use in the compositions described herein include branched polyalkanes or polysiloxanes that can lower the $T_g$ of the composition. Such flexibilizers include, for example, polyethers, polyesters, polythiols, polysulfides, and the like. If used, flexibilizers typically are present in the range of about 0.5 weight percent up to about 30 weight percent of the composition.

The flexibilizers may also be reactive; that is, they may be functionalized so as to react into the cured reaction product. In such cases, hydroxyl-functionalized resins can be used, as they tend to co-react with cationically curable components, such as epoxy resins, and thus used can modify the mechanical properties of the cured products.

For instance, hydroxy-functionalized aliphatic polyester diols provide improved flexibility to the cured composition. One commercially available example of the diol is K-FLEX A307, which is from King Industries. K-FLEX A307 is reported by the manufacturer to be a low viscosity, 100% solids linear, saturated, aliphatic polyester diol with primary hydroxyl groups. K-FLEX A307 is promoted to have been designed as a flexibility modifier for acrylic/isocyanates and acrylic/melamine systems. Commercial applications are advertised as automotive OEM, automotive refinish, aerospace, industrial maintenance, and plastic coatings.

Others include PolyTHF 650/1400/2000/2900 (sold under the trade name TERATHANE), polycaprolactone diols and triols (Aldrich), polydimethylsiloxane-polycaprolactone diols (such as WAX 350 OH D from Wacker), K-PURE CDR-3441, CDR-3319 (King Industry), primary or secondary hydroxyl terminated polybutadienes/hydrogenated polybutadienes (Cray Valley, such as PolyBd/Krasol materials), and hydrogenated castor oils, such as THIXCIN R, THIXCIN E (Elementis Specialties), and the POLYCIN series (Vertellus Specialties Inc.).

Tougheners contemplated for use particularly in the Part A composition include elastomeric polymers selected from elastomeric copolymers of a lower alkene monomer and (i) acrylic acid esters, (ii) methacrylic acid esters or (iii) vinyl acetate, such as acrylic rubbers; polyester urethanes; ethylene-vinyl acetates; fluorinated rubbers; isoprene-acrylonitrile polymers; chlorosulfonated polyethylenes; and homopolymers of polyvinyl acetate were found to be particularly useful. [See U.S. Pat. No. 4,440,910 (O'Connor), the disclosure of which is hereby expressly incorporated herein by reference]. The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

For instance, one group of such elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide colour or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In addition, vinylidene chloride-acrylonitrile copolymers [see U.S. Pat. No. 4,102,945 (Gleave)] and vinyl chloride/vinyl acetate copolymers [see U.S. Pat. No. 4,444,933 (Columbus)] may be included in the Part A composition. Of course, the disclosures of each these U.S. patents are hereby incorporated herein by reference in their entirety.

Copolymers of polyethylene and polyvinyl acetate, available commercially under the tradename LEVAMELT by LANXESS Limited, are useful.

A range of LEVAMELT agents is available and includes for example, LEVAMELT 400, LEVAMELT 600 and LEVAMELT 900. The LEVAMELT products differ in the amount of vinyl acetate present. For example, LEVAMELT 400 comprises an ethylene-vinyl acetate copolymer comprising 40 wt % vinyl acetate. The LEVAMELT-brand products are supplied in granular form. The granules are almost colourless and dusted with silica and talc. The LEVAMELT-brand products consist of methylene units forming a saturated main chain with pendant acetate groups. The presence of a fully saturated main chain is an indication that LEVAMELT is a particularly stable polymer. It does not contain any reactive double bonds which make conventional rubbers prone to aging reactions, ozone and UV light. The saturated backbone is reported to make it robust.

Interestingly, depending on the ratio of polyethylene/polyvinylacetate, the solubilities of these LEVAMELT elastomers change in different monomers and also the ability to toughen changes as a result of the solubility.

The LEVAMELT elastomers are available in pellet form and are easier to formulate than other known elastomeric toughening agents.

VINNOL brand surface coating resins available commercially from Wacker Chemie AG, Munich, Germany represent a broad range of vinyl chloride-derived copolymers and terpolymers that are promoted for use in different industrial applications. The main constituents of these polymers are different compositions of vinyl chloride and vinyl acetate. The terpolymers of the VINNOL product line additionally contain carboxyl or hydroxyl groups. These vinyl chloride/vinyl acetate copolymers and terpolymers may also be used.

VINNOL surface coating resins with carboxyl groups are terpolymers of vinyl chloride, vinyl acetate and dicarboxylic acids, varying in terms of their molar composition and degree and process of polymerization. These terpolymers are reported to show excellent adhesion, particularly on metallic substrates.

VINNOL surface coating resins with hydroxyl groups are copolymers and terpolymers of vinyl chloride, hydroxyacrylate and dicarboxylate, varying in terms of their composition and degree of polymerization.

VINNOL surface coating resins without functional groups are copolymers of vinyl chloride and vinyl acetate of variable molar composition and degree of polymerization.

Rubber particles, especially rubber particles that have relatively small average particle size (e.g., less than about 500 nm or less than about 200 nm), may also be included, particularly in the Part B composition. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the compositions of the present invention.

Typically, the core will comprise from about 50 to about 95 weight percent of the rubber particles while the shell will comprise from about 5 to about 50 weight percent of the rubber particles.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being incorporated herein by reference in its entirety.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, the disclosure of which being expressly incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

Particularly suitable dispersions of rubber particles having a core-shell structure in an epoxy resin matrix are available from Kaneka Corporation.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

Core-shell rubber particles made in this way may be dispersed in a thermosetting resin matrix, such as an epoxy matrix or a phenolic matrix. Examples of epoxy matrices include the diglycidyl ethers of bisphenol A, F or S, or biphenol, novalac epoxies, and cycloaliphatic epoxies. Examples of phenolic resins include bisphenol-A based phenoxies. The matrix material ordinarily is liquid at room temperature.

When used, these core-shell rubber particles allow for toughening to occur in the composition and oftentimes in a predictable manner—in terms of temperature neutrality toward cure—because of the substantial uniform dispersion, which is ordinarily observed in the core-shell rubber particles as they are offered for sale commercially.

Many of the core-shell rubber particle structures available from Kaneka, such as those available under the KANEACE tradename, are believed to have a core made from a copolymer of (meth)acrylate-butadiene-styrene, where the butadiene is the primary component in the phase separated particles, dispersed in epoxy resins. Other commercially available masterbatches of core-shell rubber particles dispersed in epoxy resins include GENIOPERL M23A (a dispersion of 30 weight percent core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted); the silicone elastomer core represents about 65 weight percent of the core-shell particle), available from Wacker Chemie GmbH.

In the case of those rubber particles that do not have such a shell, the rubber particles may be based on the core of such structures.

Preferably, the rubber particles are relatively small in size. For example, the average particle size may be from about 50 to about 300 μm, or from about 100 to about 200 μm.

The rubber particles generally are comprised of a polymeric material having elastomeric or rubbery properties (i.e., a glass transition temperature less than about 0° C., e.g., less than about −30° C.). For example, the rubber particles may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) and polysiloxanes. The rubber particles may contain functional groups such as carboxylate groups, hydroxyl groups or the like and may have a linear, branched, crosslinked, random copolymer or block copolymer structure.

For instance, the rubber particles may be formed predominantly from feed stocks of dienes such as butadiene, (meth)acrylates, ethylenically unsaturated nitriles such as acrylonitrile, and/or any other monomers that when polymerized or copolymerized yield a polymer or copolymer having a low glass transition temperature.

The rubber particles may be used in a dry form or may be dispersed in a matrix, as noted above.

Typically, the composition may contain from about 0.05 to about 35 weight percent (in one embodiment, from about 15 to about 30 weight percent) rubber particles.

Suitably, when present in Part A, core-shell rubber particles are present in an amount of from about 0.1 to about 7.5 weight percent, based on the total weight of the composition of Part A. Optionally, core-shell rubber particles are present in Part A in an amount of from about 1 to about 5 weight percent, based on the total weight of the composition of Part A.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

A portion of the rubber particles may be supplied in the form of a masterbatch where the particles are stably dispersed in an epoxy resin matrix and another portion may be supplied to the adhesive composition in the form of a dry powder (i.e., without any epoxy resin or other matrix material). For example, the adhesive composition may be prepared using both a first type of rubber particles in dry powder form having an average particle diameter of from about 0.1 to about 0.5 μm and a second type of rubber particles stably dispersed in a matrix of liquid bisphenol A diglycidyl ether at a concentration of from about 5 to about 50 percent by weight having an average particle diameter of from about 25 to about 200 nm. The weight ratio of first type:second type rubber particles may be from about 1.5:1 to about 0.3:1, for example.

The chemical composition of the rubber particles may be essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma radiation such that the rubber is more highly crosslinked near the surface of the particle than in the centre of the particle.

Rubber particles that are suitable for use in the present invention are available from commercial sources. For example, rubber particles supplied by Eliokem, Inc. may be used, such as NEP R0401 and NEP R401S (both based on acrylonitrile/butadiene copolymer); NEP R0501 (based on carboxylated acrylonitrile/butadiene copolymer; CAS No. 9010-81-5); NEP R0601A (based on hydroxy-terminated polydimethylsiloxane; CAS No. 70131-67-8); and NEP R0701 and NEP 0701S (based on butadiene/styrene/2-vinylpyridine copolymer; CAS No. 25053-48-9). Also those available under the PARALOID tradename, such as PARALOID 2314, PARALOID 2300, and PARALOID 2600, from Dow Chemical Co., Philadelphia, PA, and those available under the STAPHYLOCID tradename, such as STAPHYLOCID AC-3832, from Ganz Chemical Co., Ltd., Osaka, Japan.

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition. For example, dry rubber particles may be blended with epoxy resin and milled or melt compounded for a length of time effective to essentially completely disperse the rubber particles and break up any agglomerations of the rubber particles.

In addition, Nanoresins offers commercially products under the tradenames ALBIDUR (epoxy resins containing core-shell silicone rubber particles; such as EP 2240, EP2240A, EP 5340);
ALBIFLEX (epoxy-siloxane block copolymer resins); and ALBIPOX (epoxy resins containing epoxy-nitrile butadiene rubber adducts).

Thickeners or viscosity modifiers are also useful. Useful materials in this regard include polyvinyl butyral resins sold under the tradename MOWITAL (Kuraray Ltd) such as Mowital B30T, B60T, B20H, B30H, B45H, B60H, B30HH and B60HH.

Other additives may also be included in the Part A composition. For instance, phosphoric acid may be included in the Part A composition. When included at levels in the range of about 50 ppm to about 1,000 ppm, such as about 100 to about 500 ppm, and applied to at least one aluminium substrate to be joined in a bonded assembly, improved strength and strength retention may be observed. More specifically, humidity, heat aging and solvent immersion testing show that the addition of phosphoric acid to the inventive two-part cyanoacrylate/cationically curable adhesive systems, may lead to dramatic improvements adhesive with excellent properties on both metals and plastics, particularly on aluminium durability.

In practice, each of the Part A and the Part B compositions are housed in separate containment vessels in a device prior to use, where in use the two-parts are expressed from the vessels mixed and applied onto a substrate surface. The vessels may be chambers of a dual chambered cartridge, where the separate parts are advanced through the chambers with plungers through an orifice (which may be a common one or adjacent ones) and then through a mixing dispense nozzle. Or the vessels may be coaxial or side-by-side pouches, which may be cut or torn and the contents thereof mixed and applied onto a substrate surface.

The invention will be more readily appreciated by a review of the examples, which follow.

Examples

Thixotropic agents were screened for compatibility with the first part of the composition which comprises a cyanoacrylate and a cationic catalyst.

The compositions of Table 1 were prepared and the viscosity of each composition was measured using a Brookfield CAP 2000 viscometer at 25° C., with spindle no. 5, and at 20 rpm. The initial appearance of the compositions was also noted.

TABLE 1

| | Example Number | | |
|---|---|---|---|
| | 1 | 2 | 3 |
| Component | Amt (wt %) | Amt (wt %) | Amt (wt %) |
| Ethyl-2-cyanoacrylate | 77.19 | 76.79 | 76.41 |
| $BF_3$ stock solution | 0.99 | 0.99 | 0.98 |
| Phosphoric acid | 0.05 | 0.05 | 0.05 |
| Cationic catalyst | 0.97 | 0.97 | 0.96 |
| Thickener | 19.8 | 19.70 | 19.6 |
| Short Stuff E 380 F | 1 | 1.5 | 2 |

The compositions of Table 1 were packed into 50 g 1:1 cartridge and aged for 72 hours at 82° C. The viscosity of each composition was measured after 72 hours using Brookfield CAP 2000 (25° C., Spindle no. 5, 20 rpm). The appearance and viscosity for each formulation was recorded before and after ageing, see Table 2.

TABLE 2

| | Example Number | | |
|---|---|---|---|
| Properties | 1 | 2 | 3 |
| Initial Appearance | White | White | White |
| Post 72 hrs at 82 C. Appearance | Light yellow | Light Yellow | Light Yellow |
| Initial Viscosity (mPa · s) | 7500 | 10350 | 11625 |
| Post 72 hrs at 82 C., Viscosity (mPa · s) | 12225 | 25500 | 23925 |
| Post 1 week at 55 C., Viscosity (mPa · s) | 9450 | 14050 | 15500 |
| Post 2 week at 55 C., Viscosity (mPa · s) | 12490 | 17250 | 18225 |
| Post 3 week at 55 C., Viscosity (mPa · s) | 15825 | 22925 | — |

The polyethylene fibres demonstrated an excellent thixotropic effect, increasing the viscosity of the Part A composition, without leading to gelation of the samples. This represents a marked improvement over alternative thixotropic additives (when added to Part A), such as GENIOPERL P-52, BLENDEX 338 and KANE ACE B-564, each of which led to sample gelation of the cyanoacrylate component.

The properties of cured two-part curable compositions having the compositions of Table 1 as the Part A component and having the composition provided in Table 3 as the Part B component were then evaluated.

TABLE 3

|  | Example Number/Amt (wt %) |
|---|---|
| Component | 4 |
| Epoxy monomer | 80.7 |
| Fumed silica | 4 |
| 2,2'dipyridyl disulphide | 0.3 |

Each of the Part A compositions in Table 1 was mixed together with the Part B composition of Table 3 and properties of the resulting cured compositions were assessed.

TABLE 4

| | Adhesive Combination | | | | | |
|---|---|---|---|---|---|---|
| | C1 | | C2 | | C3 | |
| Part A (Example Number) | 1 | 1 | 2 | 2 | 3 | 3 |
| Part B (Example Number) | 4 | 4 | 4 | 4 | 4 | 4 |
| Aging conditions | — | 82° C./ 72 hrs | — | 82° C./ 72 hrs | — | 82° C./ 72 hrs |
| Property | | | | | | |
| Bead test (min) | 5 | 4 | 5 | 4 | 4 | 5 |
| 0 mm gap fixture time (s), Al substrate | 180 | 240 | 180 | 210 | 170 | 270 |
| 1 mm gap fixture time (min), Al substrate | 7 | 7 | 7 | 7 | 5 | 7 |
| shear strength GBMS (after curing for 24 hours at 40° C.) (N/mm$^2$) | 19.83 | 15.3 | 19.15 | 15.51 | 19.36 | 16.78 |
| shear strength Al (after curing for 24 hours at 40° C.) (N/mm$^2$) | 13.82 | 9.85 | 13.33 | 10.16 | 13.2 | 13.11 |

The bead test is carried out by depositing 3 beads of mixed adhesive having a length of 300 mm and a width of 4 mm on a polyethylene sheet. On completion of deposition of the third bead timing is begun. After 1 minute an applicator stick is dragged across the third bead 120 mm from the start of the third bead. An applicator stick is then dragged across the third bead a further 10 mm along the bead (i.e. 130 mm from the start of the bead), and the process is repeated at 1 minute time intervals and 10 mm length. There are three possible outcomes: (i) the bead is completely broken by dragging the applicator stick across the bead, and therefore the bead is deemed uncured; this time is marked with an "X", and the time corresponding to the last "X" is recorded as the onset time; (ii) there is some resistance when dragging the applicator stick across the bead and only some material is dragged from the bead, this means the bead is partially cured; this time point is marked with a "~"; (iii) no residue is dragged away from the bead and a clicking noise can be heard as the applicator stick is dragged across the bead; this time point is marked with a "✓", the time corresponding to the "✓" is recorded as the cured time.

The fixture times were evaluated for each of the 2K compositions formed from Part A compositions of Table 1 combined with a Part B composition as specified in Table 3 on lap shear adherend substrates constructed from Aluminium (Al). Fixture times were evaluated with a gap of 0 mm between the substrates and also with a gap of 1 mm between the substrates. Sufficient quantities of each part of the adhesive composition were applied to the lap substrates to ensure complete coverage of a 322.6 mm$^2$ (0.5 in.$^2$) area. Fixture time which is defined as the minimum time required for bonded substrates to fully support a suspended 3 kg mass from one substrate whilst the other is clamped vertically was evaluated for adhesive combinations C1 to C3 as specified in Table 4.

The curable 2K compositions of the invention were applied as a coating to a first lap shear adherend (for example a metallic substrate) and an assembly is prepared by clamping the first lap shear to the second lap shear with the curable 2K composition sandwiched between said first and second adherends. The clamped assembly is allowed to cure for a period of 24 hours at 40° C., and lap shear strength was determined on an Instron, according to ASTM D1002-05.

The effect of including core-shell rubber particles in the compositions of the invention was then assessed.

TABLE 5

| | Example Number | | | |
|---|---|---|---|---|
| | 5 | 6 | 7 | 8 |
| Component | Amt (wt %) | Amt (wt %) | Amt (wt %) | Amt (wt %) |
| Ethyl-2-cyanoacrylate | 75.628 | 74.07 | 72.51 | 74.848 |
| BF$_3$ Stock solution | 0.97 | 0.95 | 0.93 | 0.96 |
| stabiliser | 0.052 | 0.05 | 0.05 | 0.052 |
| Cationic catalyst | 0.95 | 0.93 | 0.91 | 0.94 |
| Plasticiser | 19.4 | 19 | 18.6 | 19.2 |
| Blendex 338 | 0 | 0 | 0 | 3 |
| Kane Ace M-521 | 2 | 3 | 5 | 0 |
| Short Stuff E 380 F | 1 | 2 | 2 | 1 |

Compositions as provided in Table 5 were prepared and the initial and aged viscosities of said compositions were evaluated. The compositions of table 5 were packed into 50 g 1:1 cartridge and aged for 72 hours at 82° C. The viscosity of each composition was measured after 72 hours using Brookfield CAP 2000 (25° C., Spindle no. 5, 20 rpm). The appearance and viscosity for each formulation was recorded before and after ageing, see Table 6.

TABLE 6

| | Example Number | | | |
|---|---|---|---|---|
| Properties | 5 | 6 | 7 | 8 |
| Initial Appearance | White | White | White | White |
| Post 72 hrs at 82° C. Appearance | Light yellow | Light Yellow | Light Yellow | Light Yellow |

TABLE 6-continued

| Properties | Example Number | | | |
|---|---|---|---|---|
| | 5 | 6 | 7 | 8 |
| Initial Viscosity (mPa·s) | 9850 | 14625 | 15650 | 11550 |
| Post 72 hrs at 82° C., Viscosity (mPa·s) | 18600 | 28800 | 35100 | 25800 |
| Post 1 week at 55° C., Viscosity (mPa·s) | 13800 | — | — | 16820 |
| Post 2 week at 55° C., Viscosity (mPa·s) | 15150 | — | — | 20300 |
| Post 3 week at 55° C., Viscosity (mPa·s) | 18825 | — | — | — |

The Part A compositions of Example 33A and 33D specified in Table 5 were mixed together with the Part B composition of Table 3 and properties of the resulting cured compositions were assessed, see table 7.

TABLE 7

| | Adhesive Combination | | | |
|---|---|---|---|---|
| | C4 | | C5 | |
| Part A (Example number) | 5 | 5 | 8 | 8 |
| Part B (Example number) | 4 | 4 | 4 | 4 |
| Ageing conditions | — | 82° C./72 hrs | — | 82° C./72 hrs |
| Property | | | | |
| Bead test (min) | 5 | 4 | 5 | 5 |
| 0 mm gap Fixture time (s), Al substrate | 180 | 240 | 170 | 270 |
| 1 mm gap fixture time (min) Al substrate | 7 | 6 | 6 | 7 |
| shear strength GBMS (after curing for 24 hours at 40° C.) (N/mm²) | 19.88 | 16.19 | 16 | 16.78 |
| shear strength Al (after curing for 24 hours at 40° C.) (N/mm²) | 13.34 | 11.17 | 13.36 | 10.67 |

The bead test, fixture times and shear strengths were determined as described above.

Advantageously, the fixture time for the compositions of the invention were not deleteriously affected by the incorporation of the thixotropic agents in Part A of the 2K composition. Furthermore, lap shear strength for the cured compositions on grit blasted mild steal and on aluminium substrates were comparable to those for prior art 2K compositions, despite the incorporation of the thixotropic agents in Part A of the 2K composition. Advantageously, by incorporating the polyolefin fibres as a thixotropic agent in the Part A composition, the viscosities of the Part A and Part B compositions are well matched and excellent mixing of said parts is achieved.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A two-part curable composition comprising:
   a. a first part comprising a cyanoacrylate component, a cationic catalyst, and a plurality of polyolefin fibres having an average length of from about 400 μm to about 1000 μm and an average diameter of more than about 5 μm and less than about 25 μm, which are present in an amount of from about 0.5 wt % to about 3.5 wt % based on the total weight of the first part of the composition;
   b. a second part comprising a cationic curable component, and an initiator component;
   wherein when mixed together the cationic catalyst initiates cure of the cationic curable component.

2. The composition of claim 1, wherein the first part has an initial viscosity from about 6,000 to about 16,000 m·Pas, when measured at 25° C.; and wherein the first part has a viscosity of from about 12,000 m·Pas to about 48,000 m·Pas, when measured at 25° C., after aging for 72 hours at 82° C.

3. The composition of claim 1, wherein the polyolefin fibres are high density polyethylene.

4. The composition of claim 1, wherein the viscosity of the first part when measured at 25° C., after ageing for 72 hours at 82° C., is less than about three times the initial viscosity of the first part when measured at 25° C.

5. The composition of claim 1, wherein the cyanoacrylate component comprises $H_2C=C(CN)-COOR$, wherein R is selected from alkyl, alkoxyalkyl, cycloalkyl, alkenyl, aralkyl, aryl, allyl and haloalkyl groups.

6. The composition of claim 1, wherein the cationic catalyst comprises salts of lithium and non-nucleophilic acid; or salts of Group II metals of the Periodic Table and non-nucleophilic acids.

7. The composition of claim 6, wherein the non-nucleophilic acid has a pH of less than 1.0 when measured as a 10% by weight solution in water.

8. The composition of claim 6, wherein the non-nucleophilic acid is a member selected from the group consisting of fluoroboric acids, fluoroarsenic acids, fluoroantimonic acids, and fluorophosphoric acids.

9. The composition of claim 1, wherein the cationic catalyst is a member selected from the group consisting of lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate, lithium hexafluoroarsenate, lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, diazonium salts, trialkoxyboroxine curing agents, and combinations thereof.

10. The composition of claim 1, wherein the cationic curable component is selected from an epoxy component, an episulfide component, an oxetane component, a vinyl ether component and combinations thereof.

11. The composition of claim 1, wherein the cationic curable component is an epoxy component selected from the group consisting of cycloaliphatic epoxy, aromatic epoxy, aliphatic epoxy and hydrogenated aromatic epoxy.

12. The composition of claim 11, wherein the epoxy component comprises a member selected from the group consisting of bisphenol-A diglycidyl ether, hydrogenated bisphenol-A diglycidyl ether, bisphenol-F diglycidyl ether, hydrogenated bisphenol-F diglycidyl ether, bisphenol-E diglycidyl ether, hydrogenated bisphenol-E diglycidyl ether, bisphenol-S diglycidyl ether, hydrogenated bisphenol-S diglycidyl ether, biphenyl diglycidyl ether, and hydrogenated biphenyl diglycidyl ether.

13. The composition of claim 1, wherein the first part is housed in a first chamber of a dual chamber syringe and the second part is housed in a second chamber of the dual chamber syringe.

14. The composition of claim 1, wherein the first part further comprises phosphoric acid.

15. The composition of claim 1, wherein the second part further comprises at least one of a plasticizer, a filler and a toughener.

16. The composition of claim 15, wherein the toughener is a member selected from the group consisting of (1)(a) reaction products of the combination of ethylene, methyl acrylate and monomers having carboxylic acid cure sites, (2)(b) dipolymers of ethylene and methyl acrylate, (3) combinations of (a) and (b), (4) vinylidene chloride-acrylonitrile copolymers, (5) vinyl chloride/vinyl acetate copolymer, (6) copolymers of polyethylene and polyvinyl acetate, and combinations thereof.

17. The composition of claim 1, wherein the first part and the second part are present in a ratio of about 1:1 by volume.

18. The composition of claim 1, wherein the first part and the second part are each housed in a separate chamber of a dual chambered container.

19. A two-part curable composition comprising:
a. a first part comprising a cyanoacrylate component, a cationic catalyst, and a plurality of polyolefin fibres;
b. a second art comprising a cationic curable component, and an initiator component;
c. core-shell rubber particles comprising acrylonitrile butadiene-styrene copolymer and/or methyl methacrylate butadiene styrene copolymer, wherein the core-shell rubber particles are present in an amount of from about 0.1 to about 5 weight percent, in the first part of the composition, based on the total weight of the first part of the composition;
wherein when mixed together the cationic catalyst initiates cure of the cationic curable component.

20. The composition of claim 19, wherein the polyolefin fibres have an average length of from about 400 μm to about 1000 μm.

21. The composition of claim 19, wherein the polyolefin fibres have an average diameter of more than about 5 μm and less than about 25 μm.

22. The composition of claim 19, wherein the polyolefin fibres are present in an amount of from about 0.1 wt % to about 5 wt % based on the total weight of the first part of the composition.

23. A two-part curable composition comprising:
a. a first part comprising a cyanoacrylate component, a cationic catalyst, and a plurality of polyolefin fibres;
b. a second part comprising a cationic curable component, and an initiator component;
c. core-shell rubber particles comprising acrylonitrile butadiene-styrene copolymer and/or methyl methacrylate butadiene styrene copolymer, wherein the core-shell rubber particles have an average particle size of from about 50 μm to about 300 μm;
wherein when mixed together the cationic catalyst initiates cure of the cationic curable component.

* * * * *